United States Patent
You

(10) Patent No.: US 9,582,339 B2
(45) Date of Patent: Feb. 28, 2017

(54) OPERATION OF SOFTWARE MODULES IN PARALLEL

(71) Applicant: INTEL CORPORATION, Santa Clara, CA (US)

(72) Inventor: Zijian You, Shanghai (CN)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 13/997,637

(22) PCT Filed: Mar. 14, 2013

(86) PCT No.: PCT/CN2013/072617
§ 371 (c)(1),
(2) Date: Jun. 24, 2013

(87) PCT Pub. No.: WO2014/139125
PCT Pub. Date: Sep. 18, 2014

(65) Prior Publication Data
US 2015/0324240 A1    Nov. 12, 2015

(51) Int. Cl.
*G06F 9/52* (2006.01)
*G06F 9/38* (2006.01)
(Continued)

(52) U.S. Cl.
CPC ............... *G06F 9/52* (2013.01); *G06F 9/3851* (2013.01); *G06F 9/4401* (2013.01); *G06F 9/4881* (2013.01)

(58) Field of Classification Search
CPC ........ G06F 9/52; G06F 9/3851; G06F 9/4401; G06F 9/4881
See application file for complete search history.

(56) References Cited

U.S. PATENT DOCUMENTS 7,861,063 B1 * 12/2010 Golla ..................... G06F 9/3851
712/214
2004/0268108 A1   12/2004 Chen et al.
(Continued)

FOREIGN PATENT DOCUMENTS

CN           101807144 A    8/2010
KR         20130018108 A    2/2013

OTHER PUBLICATIONS

International Search Report and Written Opinion mailed Dec. 19, 2013 for International Application No. PCT/CN2013/072617, 10 pages.
(Continued)

*Primary Examiner* — Charles E Anya
(74) *Attorney, Agent, or Firm* — Schwabe, Williamson & Wyatt, P.C.

(57) ABSTRACT

Embodiments of computer-implemented methods, systems, computing devices, and computer-readable media (transitory and non-transitory) are described herein for accelerating a task that includes operation of a plurality of software modules among a plurality of parallel processing threads. In various embodiments, operation of the software modules may include postponement of operation of a first of the plurality of software modules in a first of the processing threads until a determination that the first software module is not deemed in operation. In various embodiments, the first software module may be deemed in operation while itself in operation or while awaiting completion of operation of any other software module called by the first software module.

14 Claims, 6 Drawing Sheets

(51) Int. Cl.
*G06F 9/44* (2006.01)
*G06F 9/48* (2006.01)

(56) References Cited

U.S. PATENT DOCUMENTS

| | | | | |
|---|---|---|---|---|
| 2005/0097294 | A1* | 5/2005 | Hepkin | G06F 9/4812 |
| | | | | 711/170 |
| 2007/0288718 | A1* | 12/2007 | Cholleti | G06F 12/0223 |
| | | | | 711/170 |
| 2008/0126764 | A1 | 5/2008 | Wu et al. | |
| 2011/0099355 | A1* | 4/2011 | Tran | G06F 9/30181 |
| | | | | 712/217 |
| 2011/0113229 | A1* | 5/2011 | Itoh | G06F 9/485 |
| | | | | 713/2 |
| 2012/0284570 | A1 | 11/2012 | Gilani | |
| 2013/0042080 | A1* | 2/2013 | Waddington | G06F 9/526 |
| | | | | 711/152 |

OTHER PUBLICATIONS

International Preliminary Report on Patentability mailed Sep. 24, 2015 for International Application No. PCT/CN2013/072617, 6 pages.

Office Action mailed Sep. 13, 2016 for Korean Patent Application No. 10-2015-7020748, 9 pages.

Extended European Search Report mailed Oct. 11, 2016 for European Patent Application No. 13877540.8, 9 pages.

\* cited by examiner

OPERATION OF SOFTWARE MODULES IN PARALLEL

CROSS REFERENCE TO RELATED APPLICATIONS

The present application is a national phase entry under 35 U.S.C. §371 of International Application No. PCT/CN2013/072617, filed Mar. 14, 2013, entitled "OPERATION OF SOFTWARE MODULES IN PARALLEL", which designated, among the various States, the United States of America. The Specification of the PCT/CN2013/072617 Application is hereby incorporated by reference.

FIELD

Embodiments of the present invention relate generally to the technical field of data processing, and more particularly, to operation of software modules in parallel.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Proper use of parallel computing can greatly enhance the efficiency of computing, providing a better user experience. For example, as use of mobile computing devices such as smart phones and computing tablets increases, start-up times become more important to the user experience. During system boot, multiple boot modules (e.g., software executable images) may be operated to initialize multiple devices and/or interfaces of a computing device. Many mobile computing devices have multiple processors, and thus are capable of parallel execution of software. However, boot modules typically are designed for serial operation.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
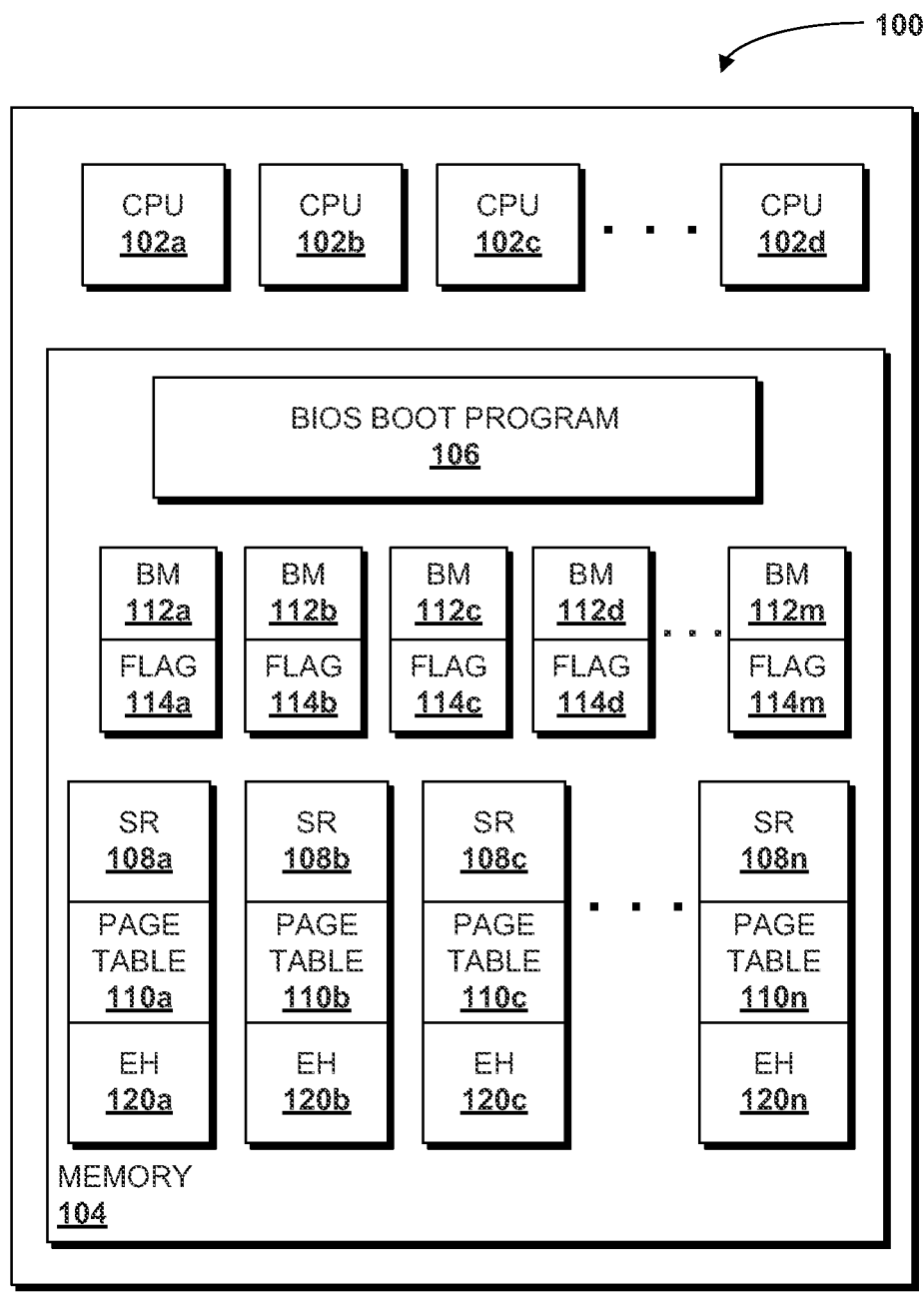
FIG. 1 schematically illustrates components that may be employed in a computing device for parallel operation of a plurality of software modules (in this example, boot modules), in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Although the following detailed description uses parallel operation of boot modules for computer boot processes as examples, disclosed techniques may be employed to enable parallel execution for tasks other than boot processes. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" or "software module" may refer to a plurality of executable instructions that forms a software executable image and/or computer program that may be executed by one or more processors. As used herein, the term "boot module" may refer to a software module that is executed, e.g., by a Basic Input/Output System ("BIOS"), during a boot process of a computing device. Boot modules may serve a variety of purposes, including but not limited to initialization of input/output devices, computing device interfaces (e.g., to the input/output devices), and so forth.

In various embodiments, a module such as a boot module may include an entry point function, which may include instructions executed on loading of the module to perform various initialization tasks. For example, an entry point function may initialize one or more inter-module "service functions." An inter-module "service function" may be called by another module, e.g., by another module's own entry point function or service functions, and may include instructions to do any work.

Modules may interact with each other through inter-module function calls. In various embodiments, writable shared data may not be accessed directly by the modules, but instead may be accessed through a call to a service function provided by the data-owning module. In various embodiments, the service functions provided by a module may not have call sequence requirements. This may ensure data integrity in the parallel execution schemes described herein.

Referring to FIG. 1, a computing device 100 configured with applicable aspects of the present disclosure may include a plurality of processors 102a-n operably coupled with a memory 104. In various embodiments, each processor 102a, 102b, . . . 102m (hereinafter simply 102) may provide a processing thread. In various embodiments, memory 104 may be dynamic random access memory ("DRAM"), although it could be other types of memory as well. In embodiments, BIOS boot program 106 may include a number of boot modules 112a-m. Typically, boot modules 112a-m may not be designed for parallel operation. However, as will be described in more detail below, through features of the present disclosure, boot modules 112a-m may be sequenced and executed in a number of parallel processing threads to accelerate the boot process.

In various embodiments, there may be inherent dependency relationships, sometimes described by "dependency expressions", between plurality of boot modules 112a-m. For instance, the dependency expression "both interface A and interface B are available" may be satisfied only after both interfaces A and B (which in some cases may be service functions of various other boot modules) are initialized by operation of appropriate boot modules 112.

In various embodiments, a plurality of instances of a scheduler 108a-n may be initialized, e.g., by BIOS boot program 106. In various embodiments, each scheduler 108a, 108b, . . . 108n (hereinafter simply 108) may be an instance of a single copy of computer code (see FIG. 6) that may be executed by one or more of plurality of processors 102a-n. In various embodiments, global variables may be shared among instances of scheduler 108a-n while local (e.g., stack) variables may be distinct among instances. In various embodiments, each scheduler 108 may be configured to manage operation of boot modules 112a-m on a respective processing thread provided by a processor 102.

In various embodiments, a plurality of distinct page tables 110a-n may be initialized, e.g., by schedulers 108a-n, for association with each processor 102. As will be described in further detail below, in various embodiments, page tables 110a-n may facilitate capture of inter-module function calls, e.g., by way of page faults. Page faults may in turn cause control to be passed to a plurality of exception handlers 120a-n, as will be described below.

As described earlier, plurality of boot modules 112a-m may be operated during a boot process of computing device 100. Operation of boot modules 112a-m, e.g., by plurality of processors 102a-n, may initialize various devices, interfaces (e.g., service functions callable by other boot modules), or other components of computing device 100 so that they may be utilized during regular operation of computing device 100.

In various embodiments, each boot module 112a, 112b . . . 112m (hereinafter simply 112) may be associated with a respective flag 114a, 114, . . . 114m (hereinafter simply 114). Flags 114a-m may be stored in a portion of memory (e.g., in RAM or a register) that is accessible to plurality of processors 102a-n. Each flag 114 may be configured to store an indication of whether the associated boot module 112 is deemed in operation, e.g., by any of plurality of processors 102a-n, or otherwise "busy."

A boot module 112 may be designated, e.g., by an instance of scheduler 108 and/or an instance of a plurality of exception handlers 120a-n, by altering a respective flag 114, to be in operation or "busy" in a number of different circumstances. For example, a particular boot module 112 may be deemed in operation where execution of its entry point function is not yet complete, regardless of whether the boot module's service functions have been established. As another example, a particular boot module 112 may be deemed busy where execution of one of its service functions, e.g., as a result of being called by another boot module, is not yet complete.

In various embodiments, an entry point function and/or service function of a particular boot module 112 need not be actively executing for that boot module 112 to be deemed in operation or busy. For example, the entry point function and/or service function of boot module 112 may have called and be awaiting return from a service function of another boot module. In such case, boot module 112 may nonetheless be deemed in operation or busy.

In various embodiments, boot module 112 may be designated "not in operation" or "ready," e.g., by an instance of scheduler 108 or an exception handler 112 altering a respective flag 114, where its entry point function has completed and none of its service functions are actively executing or awaiting return from a downstream service function (e.g., boot module 112 is ready to accept function calls).

In this manner, flags 114a-m may be utilized, e.g., by instances of scheduler 108a-n and/or exception handler 120a-n, as a signal to ensure that only one processor 102 is able to atomically operate a particular boot module at a time. In various embodiments, each flag 114 may be part of a larger data structure (not shown) generated for each boot module 112, e.g., to hold other information pertinent to operation of boot module 112.

In various embodiments, plurality of processors 102a-n may be capable of operating plurality of boot modules 112a-m in a plurality of parallel processing threads. This may, among other things, speed up start-up time (also referred to as boot time) of computing device 100. However, as alluded to earlier, not all boot modules may be designed to be operated in parallel. For example, plurality of boot modules 112a-m may be created by a variety of different original equipment manufacturers ("OEMs") for a variety of different silicon components (e.g., input/output components). Designing boot modules 112a-m for successful operation in parallel may be impractical due to the disparate and potentially competitive nature of the various OEMs, not to mention the virtually limitless possible combinations of silicon components that could be included in computing device 100 and initialized by operation of plurality of boot modules 112a-m.

Accordingly, in various embodiments, various components of computing device 100, such as one or more instances of scheduler 108a-n and/or one or more instances of exception handler 120a-n, may be configured to sequence the operation of plurality of boot modules 112a-m among a plurality of parallel processing threads during a boot process, e.g., using page tables 110a-n and/or flags 114a-m. In particular, operation of a first of plurality of boot modules 112a-m in a first of the processing threads may be postponed, e.g., by a scheduler 108 or an exception handler 120a, 120b, . . . 120n (hereinafter simply 120), until a determination that the first boot module 112 is not deemed in operation in a second of the processing threads. In various embodiments, the first boot module 112 may be deemed in operation while it awaits completion of operation of any downstream boot module called by the first boot module 112.

Figure 2:
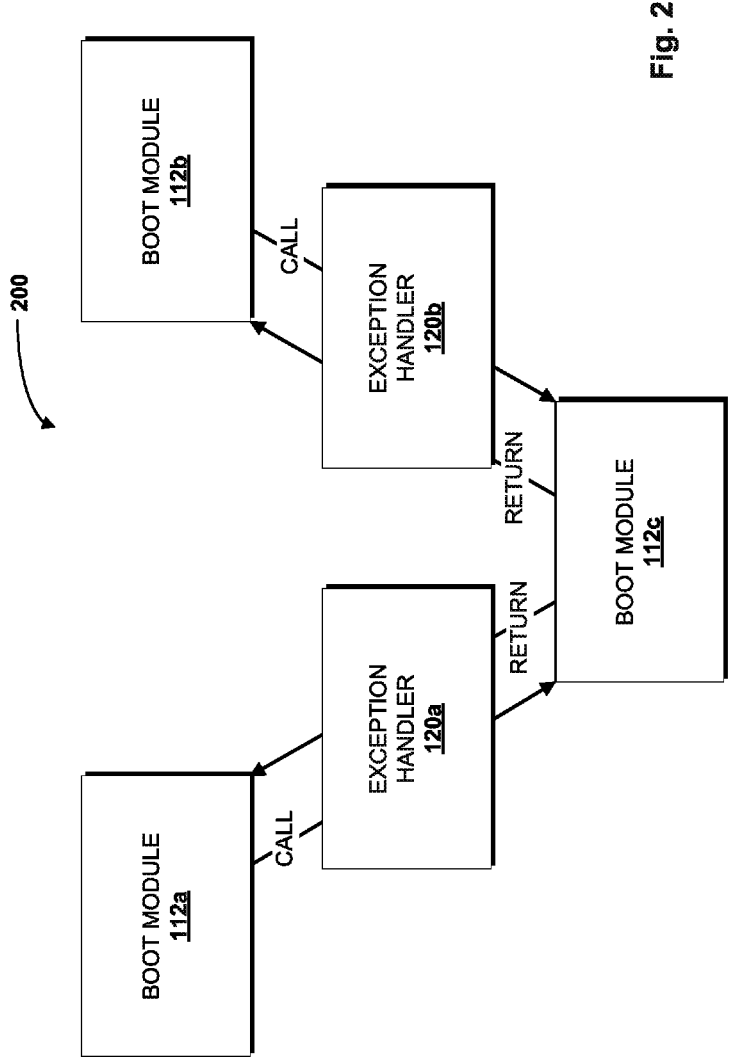
FIG. 2 schematically illustrates an example of multiple boot modules calling a single boot module, in accordance with various embodiments.

FIG. 2 depicts an example scenario 200 in which a first boot module 112a and a second boot module 112b both may call (e.g., as a function call) a third boot module 112c. Each call may trigger a page fault exception, which may cause control to be passed to an instance of an exception handler 120, namely, first exception handler 120a and second exception hander 120b. As was the case with plurality of schedulers 108a-n, each exception handler 120 may be an instance of a single copy of computer code (see FIG. 6) that may be executed by the plurality of processors 102a-n.

For example, first exception hander 120a may be passed control when first boot module 112a calls third boot module 112c. First exception hander 120a may ensure that third boot module 112c is not currently deemed in operation, e.g., in another processing thread, before passing control to third boot module 112c. After operation of third boot module 112c completes, it may return control back to first boot module 112a, which once again may trigger first exception hander 120a. First exception hander 120a may pass control directly back to first boot module 112a because first boot module 112a may have been kept in an "in operation" state while third boot module 112c was in operation. Thus, first boot module 112a may not have run on any other processing thread while awaiting third boot module 112c's completion. The same may occur between second boot module 112b, second exception handler 120b and third boot module 112c.

Figure 3:
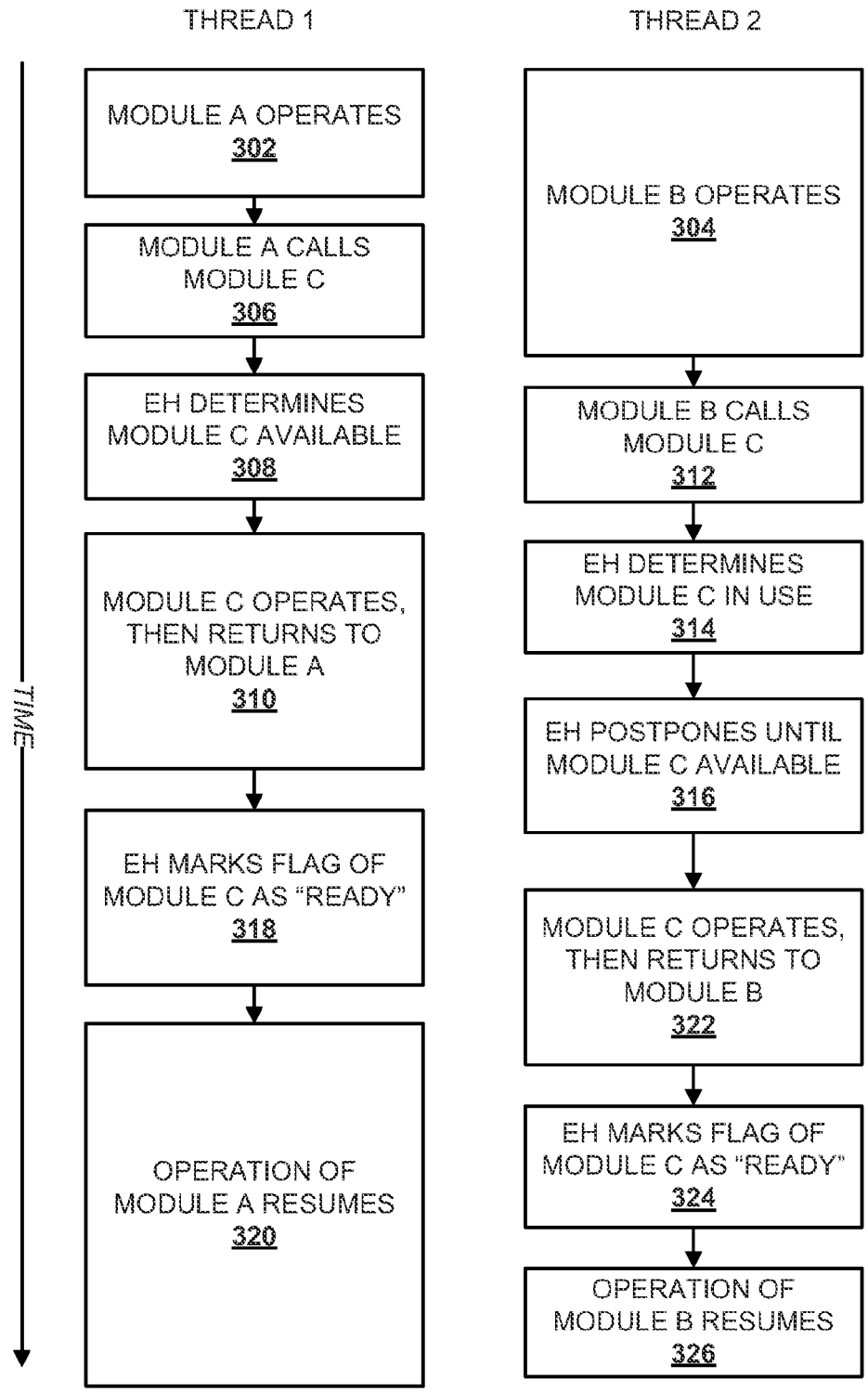
FIG. 3 schematically depicts an example of operations that may occur on two processing threads of a computing device during a parallel boot process, in accordance with various embodiments.

An example timeline showing how exception handlers 220 such as first exception hander 120a and second exception handler 120b may capture inter-module calls and ensure that a boot module 112 is operated in one processing thread at a time is depicted in FIG. 3. Two threads, THREAD 1 and THREAD 2, may be operated by two processors 102 (not shown in FIG. 3). An instance of scheduler 108 (also not shown in FIG. 3) may also operate on each thread. Time proceeds down the page, as shown by the arrow on the left. These flow charts are only meant to illustrate a general flow among multiple threads. In various embodiments, rigorous locks and/or semaphores may be employed to ensure correct multi-thread operations.

At block 302, an instance of scheduler 108 operating on THREAD 1 may operate first boot module 112a. At block 304, an instance of scheduler 108 operating on THREAD 2 may concurrently operate second boot module 112b.

At block 306, first boot module 112a may call third boot module 112c. This inter-module call may cause a page fault exception, e.g., due to a page table 110a associated with THREAD 1 having third boot module 112c marked as "disabled." Thus, at block 308, an exception handler 120 (designated "EH" in FIG. 3) such as first exception hander 120a in FIG. 2 may take over. First exception hander 120a may determine, e.g., based on flag 114c associated with third boot module 112c, that third boot module 112c is not currently deemed in operation in another processing thread. On making this determination, first exception hander 120a may alter page table 110a associated with THREAD 1 to indicate that operation of third boot module 112c is enabled and first boot module 112a is disabled. First exception handler 120a also may alter flag 114c associated with third boot module 112c to indicate that it is deemed in operation in THREAD 1, and may pass control to third boot module 112c. At block 310, third boot module 112c may be operated. Once operation of third boot module 112c is complete, its respective flag 114c may be set, e.g., by scheduler 108 or first exception hander 120a, to indicate that third boot module 112c is not deemed in operation, and control may be returned to first boot module 112a.

In the meantime, during operation of third boot module 112c on THREAD 1, at operation 312, second boot module 112b operating on THREAD 2 may call third boot module 112c. This inter-module call may cause a page fault exception, e.g., due to a page table 110 (not shown in FIG. 3) associated with THREAD 2 having third boot module 112c marked as "disabled." Thus, at block 314, another instance of exception handler 120, such as second exception handler 120b in FIG. 2 may take over. Second exception handler 120b may determine, e.g., based on flag 114c associated with third boot module 112c, that third boot module 112c is currently deemed in operation in another processing thread, namely, THREAD 1.

At block 316, second exception handler 120b may postpone operation of third boot module 112c until third boot module 112c becomes available. In some embodiments, second exception handler 120b may simply periodically check third boot module 112c's flag 114c until it is marked to indicate that third boot module 112c is no longer deemed in operation. In some embodiments, second exception handler 120b may suspend operation of second boot module 112b, set second boot module 112b's dependency condition to be "third boot module 112c be ready", and pass control back to scheduler 108. Scheduler 108 may select another module for operation and may later select second boot module 112b once its dependency condition is met.

Returning to THREAD 1, after operation of third boot module 112c is complete, its respective flag 114c may be altered by first exception hander 120a to indicate that it is not deemed in operation (e.g., "ready") at block 318. Operation of first boot module 112a on THREAD 1 may resume at block 320.

Back at THREAD 2, at block 316, second exception handler 120b may determine, e.g., based on its respective flag 114c, that third boot module 112c is now available. At block 322, third boot module 112c may operate on THREAD 2. Once operation of third boot module 112c on THREAD 2 is complete and control is returned to second boot module 112b, at block 324, second exception handler 120b may alter flag 114c associated with third boot module 112c to indicate that third boot module 112c is no longer in operation (e.g., "ready"). Operation of second boot module 112b may then resume at block 326.

Figure 4:
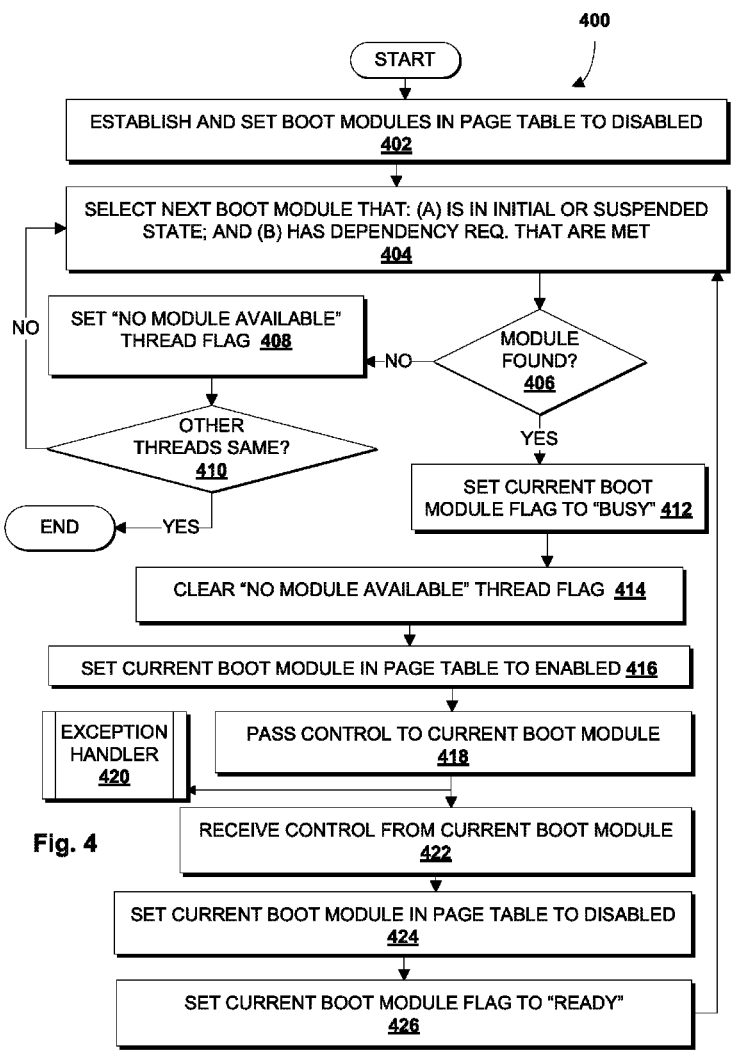
FIG. 4 schematically depicts an example method that may be implemented by a scheduler associated with a processing thread, in accordance with various embodiments.

FIG. 4 depicts an example method 400 that may be implemented by a scheduler 108, which instance is associated with a particular processing thread, in accordance with various embodiments. At operation 402, an instance of scheduler 108 may generate a page table 110 with one or more page table entries associated with each of plurality of boot modules 112a-m for a processing thread. One or more page table entries may correspond to a single boot module, depending on the boot module's address range. In addition, one or more page table entries may be set at operation 402, e.g., by scheduler 108, to indicate that execution of the associated boot module 112 is disabled or otherwise prohibited.

At operation 404, a boot module 112 may be selected for operation, e.g., by an instance of scheduler 108, from the plurality of boot modules 112a-m. An instance of scheduler 108 may use dependency expressions to select which boot module 112 to operate. In some embodiments, the instance of scheduler 108 may identify one or more boot modules 112 that are in an "initial" state (e.g., entry point function not yet operated) or "suspended" state (e.g., perhaps downstream called boot modules have completed operation since flag 114 last checked), and select for operation the boot module 112 with a satisfied dependency expression.

At operation 406, if a boot module 112 that satisfies the above-described conditions is not found, then at operation 408, the instance of scheduler 108 may set a "no boot modules available" flag associated with the current processing thread to indicate that there are no boot modules available for operation on the thread. If at operation 410 it is determined that the same is true on all other processing threads—which may indicate the computing device is fully booted—then method 400 may end. If at operation 410 it is determined that the same is not true on all threads, then method 400 may return to operation 404, and another attempt may be made to select boot module 112 for operation.

On the other hand, if at operation 406 a qualifying boot module 112 is found, then at operation 412, a flag 114 associated with the qualifying boot module (which will now be referred to as the "current boot module") may be altered to indicate that current boot module is deemed in operation, or "busy." At operation 414, the "no boot module available" thread flag may be cleared to indicate that there are boot modules available for operation on the thread. At operation 416, the one or more page table entries associated with the current boot module 112 may be altered, e.g., by an instance of scheduler 108, to indicate that execution of that particular boot module 112 is enabled or otherwise permitted. At operation 418, control of the current processing thread may then be passed, e.g., by scheduler 108, to the current boot module 112.

During operation, current boot module 112 may call (e.g., a function call) another boot module 112. Recall that one or more entries associated with the target boot module 112 were set at operation 402 to indicate that execution is disabled or prohibited. Accordingly, an inter-module function call may cause a page fault exception to be thrown, and control may be passed to an exception handler 120 at operation 420. As indicated at operation 420, exception handler 120 may have its own routine to operate, an example of which is shown in FIG. 5.

Eventually, and notwithstanding intervening operation of exception handler routine 420 and/or other boot modules 112, the current boot module 112 may be operated to completion. Control may then be passed back to scheduler 108 at operation 422. The one or more page table entries associated with the just-completed boot module 112 may be altered, e.g., by the instance of scheduler 108, back to indicate that execution is disabled or prohibited at operation 424. At operation 426, flag 114 associated with the current boot module 112 may be set, e.g., by the instance of scheduler 108, to designate the current boot module as not in operation, or "ready." Method 400 may then return to operation 404 for selection of another boot module 112.

Figure 5:
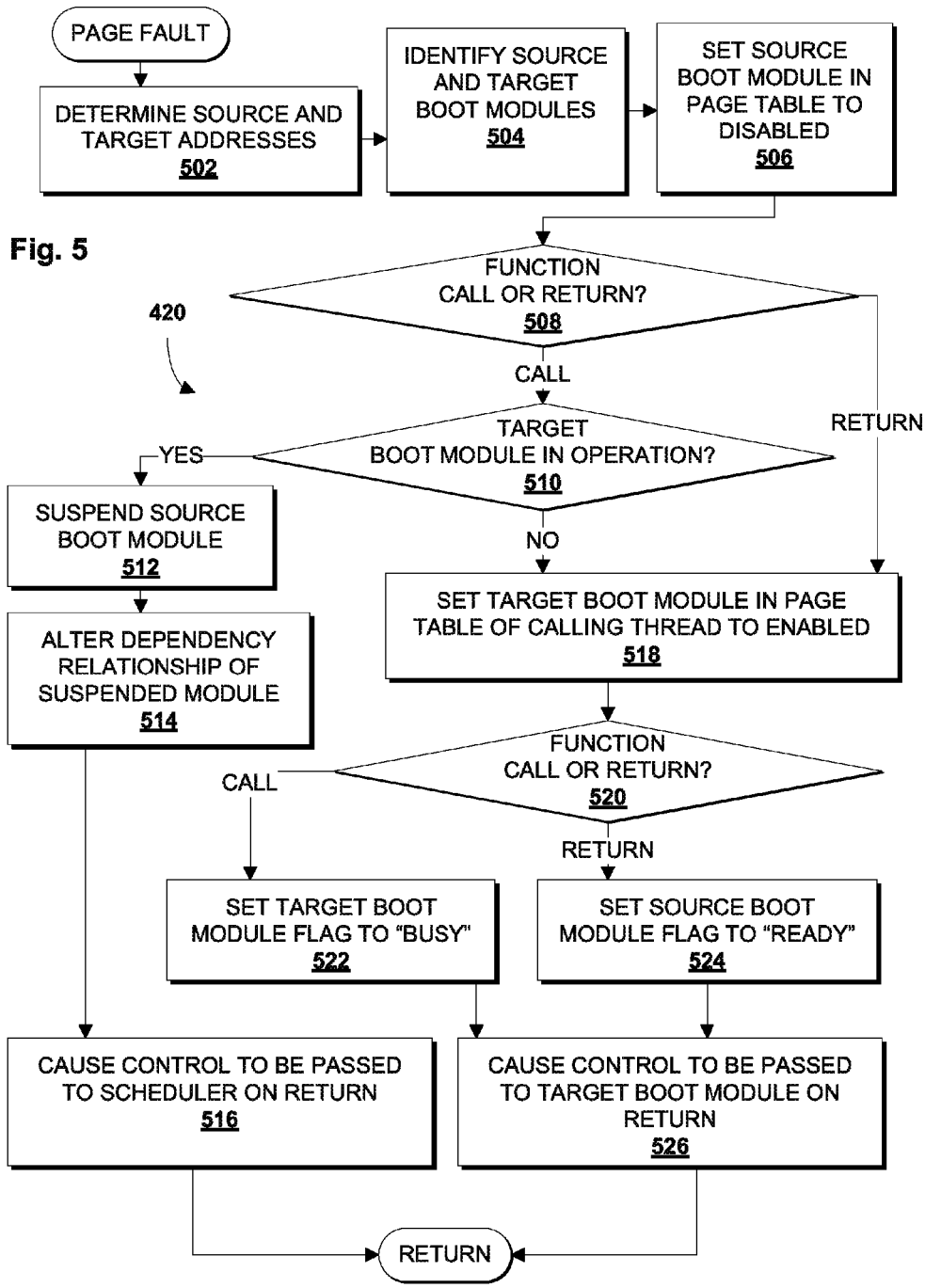
FIG. 5 schematically depicts an example method that may be implemented by an exception handler, in accordance with various embodiments.

FIG. 5 depicts an example operation flow of an instance of an exception handler routine 420, in accordance with various embodiments. Upon occurrence of a page fault exception as a result of an inter-module function call or return in a processing thread, source and target memory addresses of the inter-module function call or return may be determined, e.g., by an instance of exception handler 120 associated with the processing thread, at operation 502. For example, the instance of exception handler 120 may check a control register (e.g., CR2), a stack, or other data structures. Based on the determined memory addresses, the source and target boot modules 112 may be identified, e.g., by exception handler 120, at operation 504. For example, the instance of exception handler 120 may compare the source address and target address to addresses of the plurality of boot modules 112a-m. At operation 506, the calling thread's one or more page table entries associated with the source boot module 112 may be altered, e.g., by exception handler 120, to indicate that operation is disabled or prohibited.

At operation 508, it may be determined whether the page fault was caused by a function call or return. For example, in FIG. 2, when first boot module 112a calls third boot module 112c, that is a function call, whereas when third boot module 112c returns control to first boot module 112a, that is a return.

If the page fault was caused by a function call, then at operation 510, it may be determined, e.g., by checking flag 114 associated with the target boot module 112, whether the target boot module 112 is deemed in operation. If the target module is deemed in operation (e.g., not "ready"), in some embodiments, the instance of exception handler 120 may simply recheck flag 114 until the target boot module 112 is no longer deemed in operation. In other embodiments, including the one shown in FIG. 5, at operation 512, the instance of exception handler 120 may suspend operation of the source boot module 112 until the target boot module 112 becomes available. In some embodiments, at operation 514, the instance of exception handler 120 may alter the suspended source boot module dependency relationship to indicate that the target boot module 112 must not be deemed in operation (e.g., in a "ready" state). At operation 516, the instance of exception handler 120 may cause control to be passed to scheduler 108 on exception handler return, e.g., by setting its program counter accordingly, and then exception handler method 420 may return.

Back at operation 510, if the target boot module is not deemed in operation (e.g., flag 114 set to "ready"), then at operation 518, the one or more page table entries associated with target boot module 112 may be altered to indicate that operation of target boot module 112 is enabled or otherwise permitted. Note that at operation 508, if the page fault was determined to have been caused by a return, then operations 510-516 may be skipped and method 420 may proceed directly to operation 518.

At operation 520, it may once again be determined, e.g., by the instance of exception handler 120, whether the page fault was caused by a function call or a return. If the answer at operation 520 is a function call, then at operation 522, flag 114 associated with target boot module 112 may be set, e.g., by exception handler 120, to indicate that it is in operation or "busy." If the answer at operation 520 is a return, then at operation 524, flag 114 associated with the source boot module may be set to "ready." Either way, at operation 526, exception handler may cause control to be passed to the target boot module 112 on exception handler return, e.g., by setting its program counter accordingly. Method 420 may then return.

Figure 6:
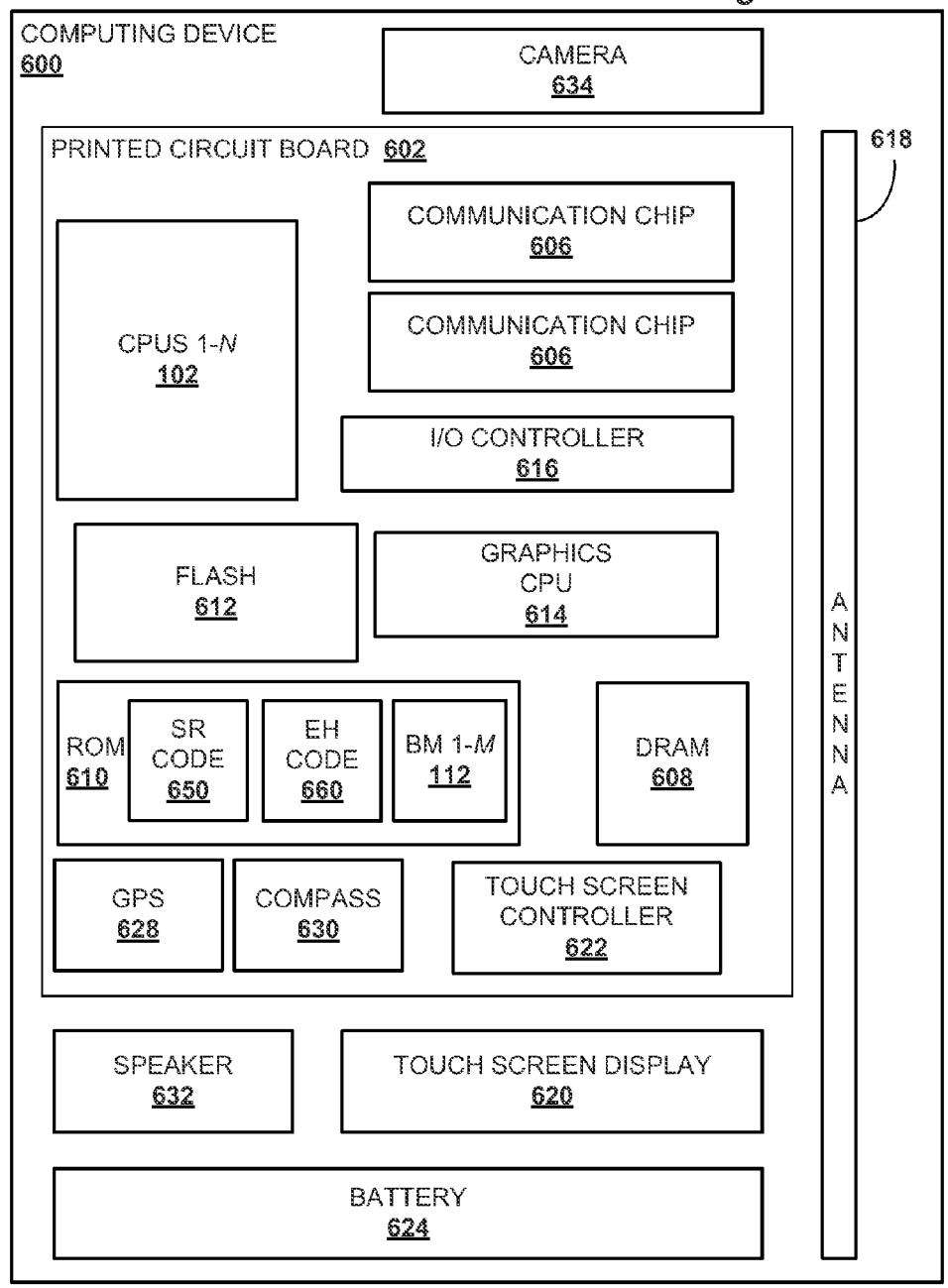
FIG. 6 schematically depicts an example computing device on which disclosed methods and computer-readable media may be implemented, in accordance with various embodiments.

FIG. 6 illustrates an example computing device 600, in accordance with various embodiments. Computing device 600 may include a number of components, plurality of processors 102 and, in some cases, one or more communication chips 606. In various embodiments, the processors 102 may be processor cores. In various embodiments, the communication chips 606 may also be physically and electrically coupled to the processors 102. In further implementations, the communication chips 606 may be part of processors 102. In various embodiments, computing device 600 may include printed circuit board ("PCB") 602. For these embodiments, processors 102 and communication chips 606 may be disposed thereon. In alternate embodiments, the various components may be coupled without the employment of PCB 602.

Depending on its applications, computing device 600 may include other components that may or may not be physically and electrically coupled to the PCB 602. These other components include, but are not limited to, volatile memory (e.g., dynamic random access memory 608, also referred to as "DRAM"), non-volatile memory (e.g., read only memory 610, also referred to as "ROM"), flash memory 612, a graphics processor 614, an input/output controller 616, a digital signal processor (not shown), a crypto processor (not shown), one or more antenna 618, a display (not shown), a touch screen display 620, a touch screen controller 622, a battery 624, an audio codec (not shown), a video codec (not shown), a global positioning system ("GPS") device 628, a compass 630, an accelerometer (not shown), a gyroscope (not shown), a speaker 632, a camera 634, and a mass storage device (such as hard disk drive, a solid state drive, compact disk ("CD"), digital versatile disk ("DVD"))(not shown), and so forth. In various embodiments, processors 102 may be integrated on the same die with other components to form a System on Chip ("SoC").

In various embodiments, volatile memory (e.g., DRAM 608), non-volatile memory (e.g., ROM 610), flash memory 612, and the mass storage device may include programming instructions configured to enable computing device 600, in response to execution by processors 102, to practice all or selected aspects of methods 400 and/or 420. For example, one or more of the memory components such as volatile memory (e.g., DRAM 608), non-volatile memory (e.g., ROM 610), flash memory 612, and the mass storage device may include temporal and/or persistent copies of scheduler code 650 and/or exception handler code 660 that, when executed, cause computing device 600 to operate one or more instances of scheduler 108 and/or one or more instances of exception handler 120, respectively, to practice all or selected aspects of methods 400 and/or 420.

The communication chips 606 may enable wired and/or wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. Most of the embodiments described herein include WiFi and LTE RAT as examples. However, the communication chip 606 may implement any of a number of wireless standards or protocols, including but not limited to IEEE 602.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3G, 4G, 5G, and beyond. The computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

In various implementations, the computing device 600 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 600 may be any other electronic device that processes data.

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 is directed to at least one computer-readable medium comprising instructions that, in response to execution of the instructions by a computing device, cause the computing device to accelerate a task that includes operation of a plurality of software modules among a plurality of parallel processing threads, wherein operation of the software modules comprises postponement of operation of a first of the plurality of software modules in a first of the processing threads until a determination that the first software module is not deemed in operation, wherein the first software module is deemed in operation while itself in operation or while awaiting completion of operation of any other software module called by the first software module.

Example 2 includes the at least one computer-readable medium of Example 1, wherein the instructions, in response to execution of the instructions by the computing device, cause the computing device to perform the determination in response to an inter-module function call of the first software module by a second of the plurality of software modules in operation in the first processing thread.

Example 3 includes the at least one computer-readable medium of Example 2, wherein the instructions, in response to execution of the instructions by the computing device, cause the computing device to cause the inter-module function call to trigger a page fault.

Example 4 includes the at least one computer-readable medium of Example 3, wherein the instructions, in response to execution of the instructions by the computing device, cause the computing device to implement an exception handler, wherein execution control is passed to an instance of the exception handler associated with the first processing thread in response to the page fault, and wherein the instance of the exception handler is to perform the determination.

Example 5 includes the at least one computer-readable medium of Example 1, wherein the instructions, in response to execution of the instructions by the computing device, cause the computing device to respectively initialize a plurality of page tables for the plurality of processing threads.

Example 6 includes the at least one computer-readable medium of Example 5, wherein the instructions, in response to execution of the instructions by the computing device, cause the computing device to include entries that correspond to the plurality of software modules in the plurality of page tables.

Example 7 includes the at least one computer-readable medium of Example 6, wherein the instructions, in response to execution of the instructions by the computing device, cause the computing device to initialize a first page table's entries that correspond to the plurality of software modules to indicate that operation of the plurality of software modules is disabled or prohibited in the first processing thread, and on selection of the first software module for operation, to alter one or more page table entries of the first page table that corresponds to the first software module to indicate that operation of the first software module is enabled or permitted.

Example 8 includes the at least one computer-readable medium of any one of Examples 1-6, wherein the instructions, in response to execution of the instructions by the computing device, cause the computing device to implement a scheduler that can be instantiated into respective instances for the plurality of processing threads.

Example 9 includes the at least one computer-readable medium of any one of Examples 1-6, wherein the instructions, in response to execution of the instructions by the computing device, further cause the computing device to store in memory a plurality of indicators that correspond to the plurality of software modules, wherein each indicator is configured to indicate whether a respective software module is deemed in operation.

Example 10 is directed to a system comprising: a plurality of processors to operate a plurality of software modules of a task in a plurality of parallel processing threads; memory operably coupled to the plurality of processors to store the plurality of software modules; and an exception handler to sequence operation of the software modules among the processing threads, that includes postponement of operation of a first of the plurality of software modules in a first of the processing threads until a determination that the first software module is not deemed in operation, wherein the first software module is deemed in operation while itself in operation or while awaiting completion of operation of any other software module called by the first software module.

Example 11 includes the system of Example 10, wherein the exception handler is to perform the determination in response to an inter-module function call of the first software module by a second of the plurality of software modules in operation in the first processing thread.

Example 12 includes the system of Example 11, wherein the plurality of software modules have associated statuses configured to cause the inter-module function call to trigger a page fault.

Example 13 includes the system of Example 10, further comprising a scheduler, which instances are associated with the plurality of processing threads to maintain entries that correspond to the plurality of software modules in a plurality of page tables associated with the plurality of processing threads.

Example 14 includes the system of Example 13, wherein a first page table's entries that correspond to the plurality of software modules are initialized to indicate that operation of the plurality of software modules is disabled or prohibited in the first processing thread, and on selection of the first software module for operation, the one or more page table entries of the first page table that correspond to the first software module is altered to indicate that operation of the first software module is enabled or permitted.

Example 15 includes the system of any one of Examples 10-14, wherein the memory is further to store a plurality of indicators that correspond to the plurality of software modules, wherein each indicator is configured to indicate whether a respective software module is in operation, wherein a software module is indicated in operation while it is executed by the plurality of processors or while it awaits completion of operation of a downstream software module called by the software module.

Example 16 includes a computer-implemented method, comprising: determining, by a computing device, that a first of a plurality of software modules of a task being executed among a plurality of parallel processing threads has been called by a second of the plurality of software modules operating in a first of the plurality of processing threads; determining, by the computing device, that the first software module is not deemed in operation, wherein the first software module is deemed in operation while itself in operation or while awaiting completion of operation of any other software module called by the first software module; operating, by the computing device, the first software module in the first processing thread responsive to a determination that the first software module is not deemed in operation; and postponing, by the computing device, operation of the first software module in the first processing thread responsive to a determination that the first software module is deemed in operation, until operation of the first software module is complete.

Example 17 includes the computer-implemented method of Example 16, further comprising triggering a page fault responsive to the determination that the first of the plurality of software modules has been called by the second of the plurality of software modules.

Example 18 includes the computer-implemented method of Example 17, further comprising implementing, by the computing device, an exception handler, and passing execution control to an instance of the exception handler associated with the first processing thread in response to the page fault.

Example 19 includes the computer-implemented method of Example 16, further comprising initializing, by the computing device, a plurality of respective page tables for the plurality of processing threads.

Example 20 includes the computer-implemented method of Example 19, further comprising including, by the computing device, entries that correspond to the plurality of software modules in the plurality of page tables.

Example 21 includes the computer-implemented method of Example 20, further comprising: initializing, by the computing device, a first page table's entries that correspond to the plurality of software modules to indicate that operation of the plurality of software modules is disabled or prohibited in the first processing thread; and altering, by the computing device, one or more page table entries of the first page table that correspond to the first software module to indicate that operation of the first software module is enabled or permitted, responsive to selecting the first software module for operation.

Example 22 includes the computer-implemented method of any one of Examples 16-21, further comprising implementing, by the computing device, a scheduler, to be instantiated into respective instances for the plurality of processing threads.

Example 23 includes the computer-implemented method of any one of Examples 16-21, further comprising storing, by the computing device in memory accessible to the computing device, a plurality of indicators that correspond to the plurality of software modules, wherein each indicator is configured to indicate whether a respective software module is in operation in a processing thread.

Example 24 is directed to an apparatus, comprising: means for determining that a first of a plurality of software modules of a task to be executed among a plurality of parallel processing threads has been called by a second of the plurality of software modules in a first of a plurality of processing threads; means for determining that the first software module is not deemed in operation, wherein the first software module is deemed in operation while itself in operation or while awaiting completion of operation of any other software module called by the first software module; means for operating the first software module in the first processing thread responsive to a determination that the first software module is not deemed in operation; and means for postponing operation of the first software module in the first processing thread until completion of operation of the first software module, responsive to a determination that the first software module is in operation.

Example 25 includes the apparatus of Example 24, further comprising means for triggering a page fault responsive to the determination that the first of the plurality of software modules has called the second of the plurality of software modules.

Example 26 includes the apparatus of Example 25, further comprising means for implementing an exception handler, wherein execution control is passed to an instance of the exception handler associated with the first processing thread in response to the page fault.

Example 27 includes the apparatus of Example 24, further comprising means for initializing a plurality of respective page tables for the plurality of processing threads.

Example 28 includes the apparatus of Example 27, further comprising means for including entries that correspond to the plurality of software modules in the plurality of page tables.

Example 29 includes the apparatus of Example 28, further comprising: means for initializing a first page table's entries that correspond to the plurality of software modules to indicate that operation of the plurality of software modules is disabled or prohibited in the first processing thread; and means for altering one or more page table entries of the first page table that correspond to the first software module to indicate that operation of the first software module is enabled or permitted, responsive to selecting the first software module for operation.

Example 30 includes the apparatus of any one of Examples 24-29, further comprising means for implementing, by the computing device, a scheduler to be instantiated into respective instances for the plurality of processing threads.

Example 31 includes the apparatus of any one of Examples 24-29, further comprising means for storing a plurality of indicators that correspond to the plurality of software modules, wherein each indicator is configured to indicate whether a respective software module is deemed in operation in a processing thread, wherein a software module is in operation while it executes or while it awaits completion of operation of a downstream software module called by the software module.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A system to operate a plurality of boot software modules of a task in a plurality of parallel processing threads, comprising:
    a plurality of processors to operate the plurality of boot software modules of the task in the plurality of parallel processing threads;
    memory operably coupled to the plurality of processors to store the plurality of boot software modules; and
    an exception handler implemented in software to be operated by one or more of the plurality of processors to sequence operation of the boot software modules among the processing threads, that includes postponement of operation of a first of the plurality of boot software modules in a first of the processing threads until a determination that the first boot software module is not deemed in operation, wherein the first boot software module is deemed in operation while itself in operation or while awaiting completion of operation of any other boot software module called by the first boot software module;
    wherein the exception handler is to perform the determination in response to an inter-module function call of the first boot software module by a second of the plurality of boot software modules in operation in the first processing thread;
    wherein the plurality of boot software modules have associated statuses configured to cause the inter-module function call to trigger a page fault.

2. The system of claim 1, further comprising a scheduler, which instances are associated with the plurality of processing threads to maintain entries that correspond to the plurality of boot software modules in a plurality of page tables associated with the plurality of processing threads.

3. The system of claim 2, wherein a first page table's entries that correspond to the plurality of boot software modules are initialized to indicate that operation of the plurality of boot software modules is disabled or prohibited in the first processing thread, and on selection of the first boot software module for operation, the one or more page table entries of the first page table that correspond to the first boot software module is altered to indicate that operation of the first boot software module is enabled or permitted.

4. The system of claim 1, wherein the memory is further to store a plurality of indicators that correspond to the plurality of boot software modules, wherein each indicator is configured to indicate whether a respective boot software module is in operation, wherein boot software module is indicated in operation while it is executed by the plurality of processors or while it awaits completion of operation of a downstream boot software module called by the boot software module.

5. At least one non-transitory computer-readable medium comprising instructions that, in response to execution of the instructions by a processor of a computing device, cause the computing device to:
    determine that a first of a plurality of boot software modules of a task being executed among the plurality of parallel processing threads has been called by a second of the plurality of boot software modules operating in a first of the plurality of processing threads;
    determine, with an instance of an exception handler associated with the first processing thread, that the first boot software module is not deemed in operation, wherein the first boot software module is deemed in operation while itself in operation or while awaiting completion of operation of any other boot software module called by the first boot software module;

cause, with the instance of the exception handler, the first boot software module in the first processing thread to be operated responsive to a determination that the first boot software module is not deemed in operation; and postpone, with the instance of the exception handler, causation of operation of the first boot software module in the first processing thread responsive to a determination that the first boot software module is deemed in operation, until operation of the first boot software module is complete; and trigger a page fault responsive to the determination that the first of the plurality of boot software modules has been called by the second of the plurality of boot software modules.

6. The storage medium of claim 5, wherein the computing device is further caused to pass execution control to the instance of the exception handler associated with the first processing thread in response to the page fault.

7. The storage medium of claim 5, wherein the computing device is further caused to initialize a plurality of respective page tables for the plurality of processing threads.

8. The storage medium of claim 7, wherein the computing device is further to include entries that correspond to the plurality of boot software modules in the plurality of page tables.

9. The storage medium of claim 8, wherein the computing device is further caused to initialize a first page table's entries that correspond to the plurality of boot software modules to indicate that operation of the plurality of boot software modules is disabled or prohibited in the first processing thread; and alter one or more page table entries of the first page table that correspond to the first boot software module to indicate that operation of the first boot software module is enabled or permitted, responsive to selecting the first boot software module for operation.

10. The storage medium of claim 5, wherein the computing device is further caused to provide a scheduler, to be instantiated into respective instances for the plurality of processing threads.

11. The storage medium of claim 5, wherein the computing device is further caused to store in memory accessible to the computing device, a plurality of indicators that correspond to the plurality of boot software modules, wherein each indicator is configured to indicate whether a respective boot software module is deemed in operation.

12. A computer-implemented method to operate a plurality of boot software modules of a task in a plurality of parallel processing threads, comprising:

determining, by a computing device, that a first of the plurality of boot software modules of the task being executed among the plurality of parallel processing threads has been called by a second of the plurality of boot software modules operating in a first of the plurality of processing threads;

determining, by the computing device, with an instance of an exception handler associated with the first thread, that the first boot software module is not deemed in operation, wherein the first boot software module is deemed in operation while itself in operation or while awaiting completion of operation of any other boot software module called by the first boot software module;

causing, by the computing device, with the instance of an exception handler associated with the first thread, to operate the first boot software module in the first processing thread responsive to a determination that the first boot software module is not deemed in operation;

causing, by the computing device, with the instance of an exception handler associated with the first thread, postponement of operation of the first boot software module in the first processing thread responsive to a determination that the first boot software module is deemed in operation, until operation of the first boot software module is complete; and triggering, by the computing device, a page fault responsive to the determination that the first of the plurality of boot software modules has been called by the second of the plurality of boot software modules.

13. The computer-implemented method of claim 12, further comprising passing, by the computing device, execution control to the instance of the exception handler associated with the first processing thread in response to the page fault.

14. The computer-implemented method of claim 12, further comprising initializing, by the computing device, a plurality of respective page tables for the plurality of processing threads.

* * * * *